United States Patent [19]
Chen et al.

[11] Patent Number: 5,571,454
[45] Date of Patent: Nov. 5, 1996

[54] SOLUBLE AND PROCESSABLE DOPED ELECTRICALLY CONDUCTIVE POLYMER AND POLYMER BLEND THEREOF

[75] Inventors: Show-An Chen; Mu-Yi Hua, both of Hsinchu, Taiwan

[73] Assignee: National Science Council, Taiwan

[21] Appl. No.: 214,397

[22] Filed: Mar. 16, 1994

[51] Int. Cl.$^6$ .............. H01B 1/04; H01B 1/20; H01B 1/24

[52] U.S. Cl. .............. 252/500; 528/377; 528/378

[58] Field of Search .............. 252/500; 528/377, 528/378

[56] References Cited

U.S. PATENT DOCUMENTS

| | | | |
|---|---|---|---|
| 4,569,734 | 2/1986 | Naarman et al. | 204/78 |
| 4,599,194 | 7/1986 | Frommer et al. | 252/500 |
| 4,711,742 | 12/1987 | Jen et al. | 252/500 |
| 5,093,033 | 3/1992 | Feldhues et al. | 252/500 |
| 5,185,100 | 2/1993 | Han et al. | 252/500 |
| 5,198,153 | 3/1993 | Angelopoulos et al. | 252/500 |
| 5,225,109 | 7/1993 | Feldhues et al. | 252/500 |
| 5,254,633 | 10/1993 | Han et al. | 525/327.4 |
| 5,422,423 | 6/1995 | Shacklette et al. | 528/422 |

OTHER PUBLICATIONS

Chen, Show-An et al. "Electrically Conductive Polyaniline--Poly(vinyl alcohol) Composite Films: Physical Properties and Morphological Structures", Macromolecules, 1991, vol. 24, No. 6, pp. 1242–1248.

De Paoli, M. et al. "An Electrically Conductive Plastic Composite Derived from Polypyrrole and Poly(vinyl Chloride)", J. Polym. Sci., Polym. Chem. Ed., 1985, vol. 23, pp. 1687–1698.

Hotta, S. "Electrochemical Synthesis and Spectroscopic Study of Poly(3–alkylthienylenes)", Synthetic Metals, 1987, vol. 22, pp. 103–113.

MacDiarmid, A. et al. "Polyaniline: Protonic Acid Doping to the Metallic Regime", Mol. Cryst. Liq. Cryst., 1985, vol. 125, pp. 309–318.

Hotta, S. et al. "Electrochemically Prepared Poly(3–methylthienylene) Films Doped with Iodine", Synthetic Metals, 1984, vol. 9, pp. 381–387.

Ojio, T. et al. "Highly Transparent and Conducting Polypyrrole–Poly(vinyl alcohol) Composite Films Prepared by Gas State Polymerization", Polymer Journal, 1986, vol. 18, No. 1, pp. 95–98.

Laakso, J. et al. "Conducting Polymer Blends", Synthetic Metals, 1989, vol. 28, pp. c467–c471.

Bocchi, V. et al. "Chemical Synthesis of Conducting Polypyrrole and some Composites", J. Chem. Soc., Chem. Commun., 1986, p. 148.

Leclerc, M. et al. "Synthesis and Characterization of Poly(alkylanilines)", Macromolecules, 1989, vol. 22, pp. 649–653.

Jiang, R. et al. "Electrochemical Behaviour of Soluble Polyaniline and its Chromatic Reaction in Solutions", Synthetic Metals, 1988, vol. 24, pp. 255–265.

Pomerantz, M. et al. "Processable Polymers and Copolymers of 3-alkylthiophenes and their Blends", Synthetic Metals, 1991, vol. 41–43, pp. 825–830.

Primary Examiner—Paul Lieberman
Assistant Examiner—Gregory R. Delcotto
Attorney, Agent, or Firm—Fish & Richardson P.C.

[57] ABSTRACT

This invention relates to homogeneously doped conductive polymer and a polymer blend thereof, wherein the dopant is a protonic acid having long carbon chain or larger substituent group. The resulting doped conductive polymer solution and polymer blend solution thereof can be cast to form free-standing films with metallic luster, of which the conductivities remain stable in the ambient condition and are in the range of $10^{-6}$ to $10^{-1}$ S/cm. The conductive polymer film and the conductive polymer composite film so prepared can be utilized in the anti-static wrapping materials for electronic components, and in electromagnetic interference shielding.

22 Claims, 2 Drawing Sheets

5,571,454

SOLUBLE AND PROCESSABLE DOPED ELECTRICALLY CONDUCTIVE POLYMER AND POLYMER BLEND THEREOF

BACKGROUND OF THE INVENTION

1. Field of the Invention

This invention relates to a soluble, and processable doped electrically conductive polymer and a polymer blend thereof, more particularly to a doped polymer and polymer blend thereof which are both doped with a protonic acid having a long carbon chain or a larger substituent group.

2. Description of the Prior Art

Conjugated conductive polymers have been widely investigated due to growing interest in their use in anti-static coatings, conductive paints, electromagnetic shielding, electrode coatings and the like. There have been many attempts to dope the conjugated conductive polymers with acids. The dopant often used in a general conjugated heterocyclic conductive polymer is a Lewis acid, such as $FeCl_3$, $SbF_5$, $AsF_5$, $NOPF_6$ or $SnCl_4$. An oxidation reaction is employed during such a doping process. The polymer loses electrons and a delocalized polaron and/or bipolaron are formed on the conjugated chain thereof. This causes the polymer to have an increased electrical. conductivity.

In contrast to the general conjugated heterocyclic conductive polymers, the dopant often used in a polyaniline is a protonic acid. No oxidation reaction occurs, but the imine group transforms to imine salt. Since the positive charge on the N atom of the imine salt can delocalize to the benzene ring, therefore the acid-doped polyaniline has an increased conductivity. The protonic acid often used is $H_2SO_4$, HCl, HF or $HBF_4$ as disclosed in Macromolecules, 22, 649(1989) and Synth. Met., 24, 255(1988).

The doping will make the main chain of the polymer more rigid, resulting in an aggregation of the polymer chains and thus the polymer precipitates out from the solution. This; limits the applications of the doped conductive polymers. There are two ways to improve the drawbacks as mentioned above. One way is by a chemical method. It is disclosed that a neutral conductive polymeric film is synthesized by a chemical method, then is dipped into a solution containing an oxidizing agent for doping. The dopants used include $FeCl_3$, $Fe(ClO_4)_3$ [Synth. Met., 41–43, 825(1991)], $NOPF_6$ [Synth. Met., 22, 103(1987)] and hydrochloric acid solution [Mol. Cryst. Liq. Cryst., 125, 309(1985)].

Another way is by an electrochemical method. It is disclosed that a conductive polymer film is synthesized by an electrochemical method. The conductive polymer film is synthesized and the anion of the supporting electrolyte $(Bu)_4NClO_4$ is also doped to the film at the same time [Synth. Met., 9, 381(1984)]. However, regardless of whether doping is achieved by the chemical or electrochemical method, the resultant film is brittle and insoluble; and a large area film is difficult to obtain. Thus its application is limited.

Incorporating a conductive polymer with a non-conductive conventional polymer to form a conductive polymer composite film has been disclosed. This can be achieved by an electrochemical or chemical method. Paoli et al. discloses that a polypyrrole/poly(vinyl chloride)(PVC) conductive composite film can be prepared by immersing an anode coated with a PVC film in a solution containing appropriate solvent, pyrrole monomer and an electrolyte. The PVC film will swell in the solution thus enabling the pyrrole to infiltrate into the PVC film to form the composite film [J. Polym. Sci., Polym. Chem. Ed., 23, 1687(1985)]. Also, a polyaniline/poly(vinyl alcohol) composite film has been prepared in our laboratory [Macromolecules, 24, 1242(1991)].

A conductive polymer composite film can also be prepared by a chemical method. Brocchi et al. discloses that a polypyrrole/polypropylene composite film is prepared by placing a polypropylene film at the interface of a 30% of ferric chloride solution and a 10% of pyrrole solution. The two solutions will diffuse into the polypropylene allowing polypyrrole to form in the bulk to give a composite film [J. Chem. Soc., Chem. Commun., 148(1986)]. Ojio et al. discloses that a polypyrrole/poly(vinyl alcohol) composite film can be prepared by exposing a poly(vinyl alcohol) film containing ferric chloride to pyrrole monomer vapor [Polymer J., 189(1), 95(1986)]. Laakso et al. discloses that a doped composite film can be prepared by blending a poly-3-octylthiophene with polyethylene, polystyrene and ethylene/vinyl acetate copolymer in the melted state, then processing the polymer blend to form a film and immersing the film in a $FeCl_3/CH_3NO_2$ solution or exposing the film under iodine vapor for doping [Synth. Met., 28, C467(1989)].

All the above mentioned polymer composite films have a common drawback in that the monomers cannot be evenly distributed in the matrix film. Until now, a doped polyheterocyclic compound which is soluble and processable has not been disclosed. Also, a protonic acid having a long carbon chain or a large substituent group doped therein has not been disclosed either.

SUMMARY OF THE INVENTION

An object of the present invention is therefore to provide a soluble and processable conductive polymer doped with a protonic acid having a long carbon chain or a larger substituent group.

Another object of the present invention is to provide a soluble and processable doped polymer blend which can improve the mechanical properties of the polymer, and increase the bonding strength between the polymer and substrate.

In accordance with the objects and purposes of the present invention, there is provided a soluble and processable doped conductive polymer including: (a) a conductive polymer; and (b) a protonic acid having a long carbon chain or a larger substituted group.

The present invention further provides a soluble and processable doped conductive polymer blend including: (a) a conductive polymer; (b) a protonic acid having a long carbon chain or a larger substituted group; and (c) a non-conductive polymer.

BRIEF DESCRIPTION OF THE DRAWINGS

The present invention can be more fully understood by reading the subsequent detailed description and examples; with references made to the accompanying drawings, wherein.

DETAILED DESCRIPTION OF THE INVENTION

Figure 1:
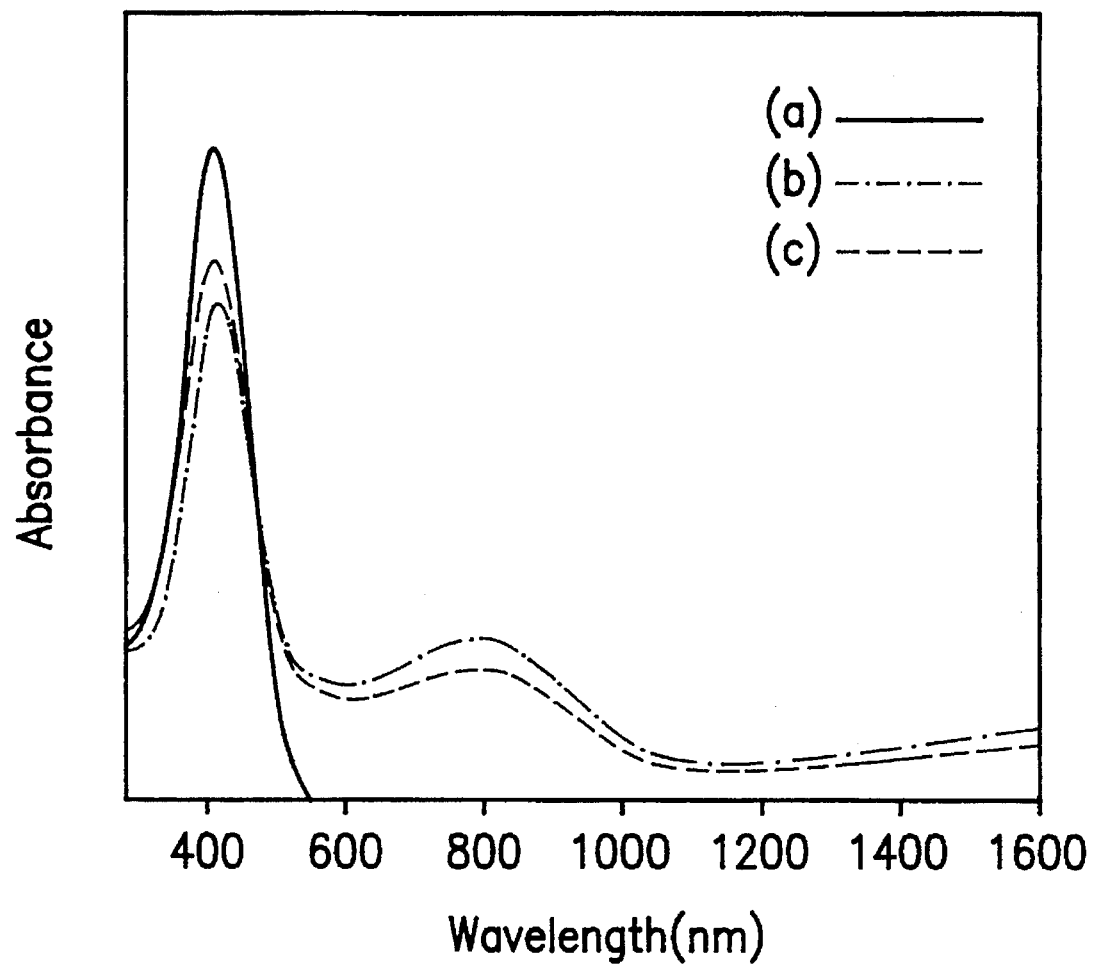
FIG. 1 shows UV-Vis spectra of the conductive polymer solutions of the present invention, wherein the solvent is toluene.

A poly(3-alkylthiophene) (P3AT) and a protonic acid having a long carbon chain or a larger substituent group are dissolved separately in an organic solvent. The two solutions are mixed thoroughly to produce a doped conductive polymer solution. The resultant polymer is still soluble and can be dissolved in a general organic solvent such as chloroform, toluene, xylene, benzene or tetrahydrofuran. Also, the polymer solution can be cast to form a soft free standing film.

The conductive polymers can be 3,4-disubstituted polythiophenes, polypyrroles and polyfurans having the formula

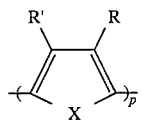

The 3-substituted groups includes:

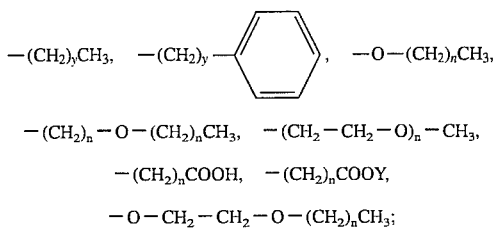

wherein y is an integer selected from 3 to 22;
n is an integer selected from 1 to 22;
Y is —$(CH_2)_n CH_3$ or

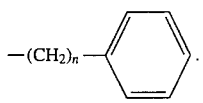

The 4-substituent groups include: —H, —$CH_3$ and —$OCH_3$. The conductive polymers can also be N-substituted polypyrroles wherein the substituted groups include alkyl, alkaryl, alkoxy, aralkyl, aryl, hydroxy, nitro, chloro and bromo.

Doping a protonic acid in the conjugated conductive polymer can not be expected by those skilled in the art. According to the present invention, the protonic acid used is relatively compatible with-the conductive polymer and the solvent. In addition, the conductive polymer will not precipitate out due to the doping of the acid. The protonic acid also acts as a plasticizer, therefore the doped conductive polymer will not shrink and is not brittle.

The protonic acids used include dodecyl benzenesulfonic acid, d-camphorsulfonic acid, and any organic sulfonic acids (R"—$SO_3H$) which are soluble in toluene, chloroform, xylene, benzene or tetrahydrofuran (THF), wherein R" is

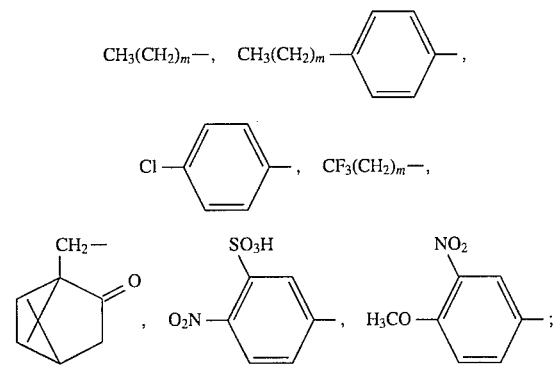

wherein m is an integer selected from 4 to 22.

Furthermore, the doped conductive polymer solution can also be blended with a non-conductive polymer in the solution state. In that way, the mechanical properties of the conductive film can be improved and the adhesion between the conductive film and the substrate also can be increased. The resultant film is resistant to air and moisture, and can be utilized in the anti-static packaging materials for the electronic components, and electromagnetic interference shielding. These non-conductive polymers, which are soluble in a solvent selected from toluene, chloroform, xylene, benzene, and THP, include polystyrenes, poly(methacrylic acid ester)s, poly(vinyl ester)s, poly(acrylic acid ester)s, poly(vinyl chloride), poly(alkane)s, poly(carbonate)s, poly(ester)s and poly(siloxane)s. The non-conductive polyemrs used in the embodiments of this invention are poly(vinyl acetate), poly(styrene), poly(n-propyl methacrylate), poly(methyl methacrylate), poly(iso-butylene), poly(n-butyl methacrylate), ethylene/vinyl acetate copolymer and poly(ethyl methacrylate). Also, the non-conductive polymer used can be a copolymer having more than one monomers selected from styrenes, methacrylic acid esters, acrylic acid esters, vinyl chloride and vinyl esters.

The following specific examples are intended to demonstrate this invention more fully without acting as a limitation upon its scope, since numerous modifications and variations will be apparent to those skilled in the art. All the conductivities in the examples were measured using the four probe method.

EXAMPLE 1

0.25 g of poly(3-dodecylthiophene) (P3DDT) and 0.016 g of dodecyl benzenesulfonic acid (DBSA) were dissolved separately in a proper amount of chloroform. The DBSA solution was slowly added to the P3DDT solution and stirred thoroughly to give a doped conductive polymer solution having brown color. The resulting homogeneous solution was cast to form a soft free-standing film of dark color with metallic luster. The conductivity of the film was $3.8 \times 10^{-4}$ S/cm as shown in Table 1.

EXAMPLE 2

0.194 g of poly(3-octylthiophene) (P3OT) and 0.20 g of DBSA were dissolved separately in a proper amount of toluene. The DBSA solution was slowly added to the P3OT solution and stirred thoroughly to give a doped conductive polymer solution having greenish brown color. The resulting homogeneous doped solution was concentrated and then cast to form a soft free-standing film of dark color with metallic luster. The conductivity of the film was $4.6 \times 10^{-1}$ S/cm as shown in Table 1. The UV-Vis spectra of the undoped and, doped P3OT solution in toluene are shown in FIG. 1 (a) and, (b), respectively. It was found that the doped P3OT solution has obvious polaron/bipolaron absorptions at 818 nm and above 1200 nm, indicating a doping of P3OT with DBSA.

EXAMPLE 3

0.194 g of P3OT and 0.033 g of DBSA were dissolved separately in a proper amount of chloroform. The DBSA solution was slowly added to the P3OT solution and stirred thoroughly to obtain a doped conductive polymer solution having brown color. The resulting homogeneous solution was: cast to give a soft free-standing film of dark color with metallic luster. The conductivity of the film was $7.3 \times 10^{-3}$ S/cm as shown in Table 1. This film is stable at ambient condition and has a glass transition temperature ($T_g$) at −46° C.

EXAMPLE 4

Figure 2:
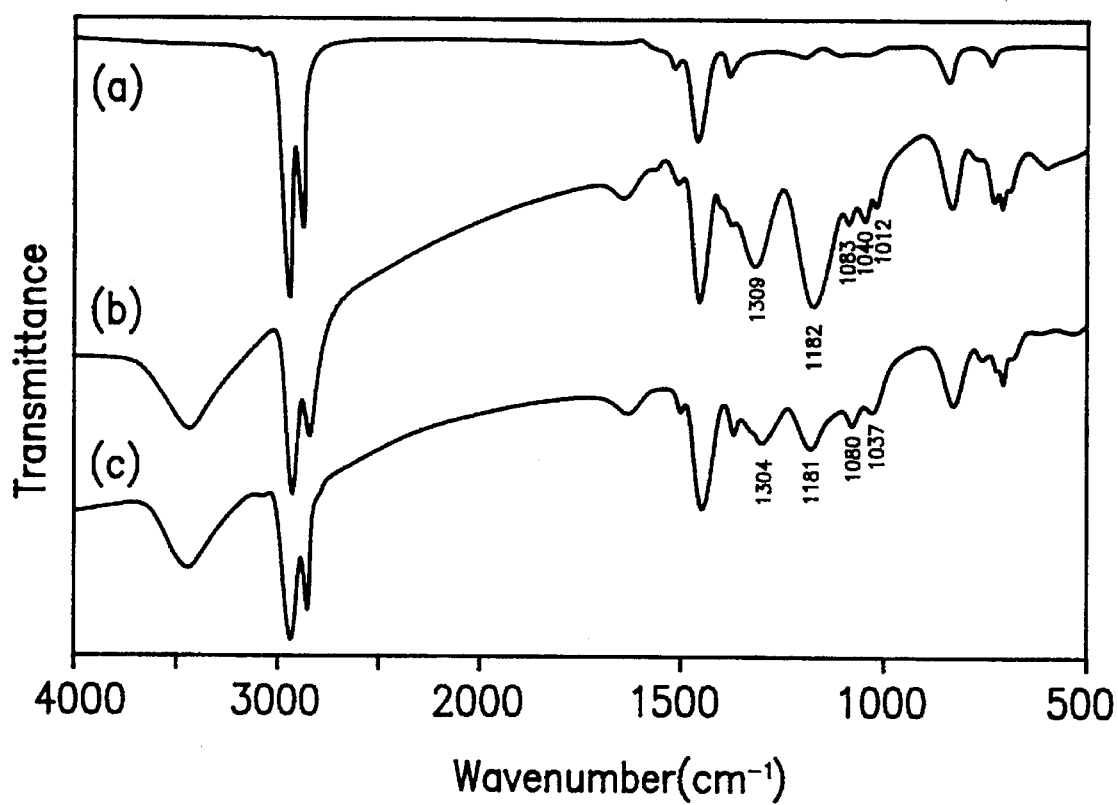
FIG. 2 shows IR spectra of the conductive polymer films of the present invention.

0.194 g of P3OT and 0.016 g of DBSA were dissolved separately in a proper amount of chloroform. The DBSA solution was slowly added to the P3OT solution and stirred thoroughly to obtain a doped conductive polymer solution having brown color. The resulting homogeneous solution was cast to form a soft free-standing film of dark color with metallic luster. The film has a conductivity of $6.0\times10^{-4}$ S/cm as shown in Table 1 and a glass transition temperature ($T_g$) at $-14°$ C. The IR spectra of the undoped and doped P3OT film cast from the solution are shown in FIG. 2 (a) and (b), respectively. It is found that the doping induced five additional peaks at the wave numbers 1309, 1182, 1083, 1040 and 1012 $cm^{-1}$ which can be assigned to T (transition) mode stretching vibrations on the ring of P3OT resulting from the generation of polaron and bipolaron, and to asymmetric and symmetric vibrations of O=S=O of DBSA. These T modes are related to the translational motion of intrinsic charge defects (polarons or bipolarons) arising from electron-phonon interactions.

EXAMPLE 5

0.194 g of P3OT and 0.007 g of DBSA were dissolved separately in a proper amount of toluene. The DBSA solution was slowly added to the P3OT solution and stirred thoroughly to give a doped conductive polymer solution with brown color. The resulting homogeneous solution was cast to form a soft free-standing film of dark color with metallic luster. The conductivity of the film was $9.2\times10^{-5}$ S/cm as shown in Table 1 and the $T_g$ thereof was $-13°$ C.

EXAMPLE 6

0.138 g of poly(3-butylthiophene) (P3BT) and 0.026 g of DBSA were dissolved separately in a proper amount of toluene. The DBSA solution was slowly added to the P3BT solution and stirred thoroughly to give a doped conductive polymer solution with brown color. The resulting homogeneous solution was cast to form a soft free-standing film of dark color with metallic luster. The conductivity of the film was $7.3\times10^{-3}$ S/cm as shown in Table 1.

EXAMPLE 7

0.138 g of P3BT and 0.019 g of d-camphorsulfonic acid (d-CSA) were dissolved separately in a proper amount of chloroform. The d-CSA solution was slowly added to the P3BT solution and stirred thoroughly to give a doped conductive polymer solution with brown color. The resulting homogeneous solution was cast to form a soft free-standing film of dark color with metallic luster. The conductivity of the film was $4.6\times10^{-4}$ S/cm as shown in Table 1.

EXAMPLE 8

The following reagents were dissolved separately in a proper amount of toluene to produce solutions: (1) 0.25 g of P3DDT, (2) 0.013 g of DBSA, and (3) 0.02 g of poly(vinyl acetate) (Mw=500,000), wherein solution(3) was dissolved at 50° C. and then allowed to cool down to room temperature. Solution(2) was slowly added to solution(1) and stirred thoroughly to give a mixed solution. Subsequently, solution(3) was slowly added to the mixed solution and stirred thoroughly to give a brown color solution of doped conductive polymer blend. The resulting homogeneous solution was cast to form a free-standing film of dark color with metallic luster having a conductivity of $5.5\times10^{-5}$ S/cm as shown in Table 2.

EXAMPLE 9

The same procedures as described in Example 8 were employed. The reagents: (1) 0.25 g of P3DDT, (2) 0.019 g of d-CSA, and (3) 0.03 g of polystryene (Mw=125,000–350,000) were dissolved separately in a proper amount of chloroform. The resulting homogeneous solution was cast to form a free-standing film of dark color with metallic luster. The conductivity of the film was $1.8\times10^{-4}$ S/cm as shown in Table 2.

EXAMPLE 10

The same procedures as described in Example 8 were employed. The reagents: (1) 0.25 g of P3DDT, (2) 0.007 g of d-CSA, and (3) 0.025 g of poly(n-propyl methacrylate) were dissolved separately in a proper amount of chloroform, wherein reagent(3) was dissolved at 50° C. and then allowed to cool down to room temperature. The resulting homogeneous solution was cast to form a free-standing film of dark color with metallic luster. The conductivity of the film was $6.6\times10^{-6}$ S/cm as shown in Table 2.

EXAMPLE 11

The same procedures as described in Example 8 were employed. The reagents: (1) 0.194 g of P3OT, (2) 0.20 g of DBSA, and (3) 9.7 g of poly(styrene) were dissolved separately in a proper amount of toluene. The resulting solution has greenish brown color. It was then cast to form a translucent free-standing film of dark violet color having a conductivity of $5.5\times10^{-4}$ S/cm as shown in Table 2. Referring to FIG. 1, curve(c) showed the UV-Vis spectrum of the doped conductive polymer blend solution. It was observed that this doped conductive polymer blend solution had polaron/bipolaron absorption at the wavelength 819 nm.

EXAMPLE 12

The same procedures as described in Example 8 were employed. The reagents: (1) 0.194 g of P3OT, (2) 0.20 g of DBSA, and (3) 9.7 g of poly(methyl methacrylate) (Mw=350,000) were dissolved separately in a proper amount of toluene, wherein reagent(3) was dissolved at 50° C. The resulting homogeneous solution was cast to form a free-standing film of dark color with metallic luster having a conductivity of $4.4\times10^{-4}$ S/cm as shown in Table 2.

EXAMPLE 13

The same procedures as described in Example 8 were employed. The reagents: (1) 0.194 g of P3OT, (2) 0.20 g of DBSA, and (3) 0.194 g of poly(iso-butylene) (Mw=2,100,000) were dissolved separately in a proper amount of chloroform, wherein reagent(3) was dissolved at 50° C. The resulting homogeneous solution was cast to form a free-standing film of dark color with metallic luster having a conductivity of $1.2\times10^{-5}$ S/cm as shown in Table 2.

EXAMPLE 14

The same procedures as described in Example 8 were employed. The reagents: (1) 0.194 g of P3OT, (2) 0.026 g of DBSA, and (3) 0.03 g of poly(methyl methacrylate) were dissolved separately in a proper amount of toluene, wherein reagent(3) was dissolved at 50° C. The resulting homogeneous; solution was cast to form a free-standing film of dark color with metallic luster having a conductivity of $4.4\times10^{-3}$ S/cm as shown in Table 2.

EXAMPLE 15

The same procedures as described in Example 8 were employed. The reagents: (1)0.194 g of P3OT, (2) 0.026 g of DBSA, and (3)0.03 g of poly(n-butyl methacrylate) were dissolved separately in a proper amount of toluene, wherein. reagent(3) was dissolved at 50° C. The resulting homogeneous solution was cast to form a free-standing film of dark color with metallic luster having a conductivity of $8.4 \times 10^{-4}$ S/cm as shown in Table 2.

EXAMPLE 16

The same procedures as described in Example 8 were employed. The reagents: (1)0.194 g of P3OT, (2)0.026 g of DBSA, and (3)0.03 g of polystyrene were dissolved separately in a proper amount of toluene. The resulting homogeneous solution was cast to form a free-standing film of dark color with metallic luster having a conductivity of $8.7 \times 10^{-3}$ S/cm as shown in Table 2 and having a Tg of $-12°$ C.

EXAMPLE 17

The same procedures as described in Example 8 were employed. The reagents: (1)0,194 g of P3OT, (2)0.016 g of DBSA, and (3)0.03 g of polystyrene were dissolved separately in a proper amount of toluene. The resulting homogeneous solution was cast to form a soft free-standing film of dark color with metallic luster having a conductivity of $1 \times 10^{-4}$ S/cm as shown in Table 2 and having a $T_g$ of $-10°$ C. Referring to FIG. 2, curve(c) showed the IR spectrum of the doped conductive polymer blend film. It can be observed that this film has new stretching vibration. peaks attributable to doping-induced vibrational modes and asymmetric and symmetric vibrations of O=S=O of DBSA. These peaks were located at 1304, 1181, 1080, and 1037 $cm^{-1}$.

EXAMPLE 18

The same procedures as described in Example 8 were employed. The reagents: (1)0.194 g of P3OT, (2)0.007 g of DBSA, and (3)0.03 g of polystyrene were dissolved separately in a proper amount of toluene. The resulting homogeneous; solution was cast to form a free-standing film of dark color with metallic luster having a conductivity of $7.7 \times 10^{-5}$ S/cm as shown in Table 2 and having a $T_g$ of $-6.4°$ C.

EXAMPLE 19

The same procedures as described in Example 8 were employed. The reagents: (1)0.194 g of P3OT, (2) 0.01 g of DBSA, and (3)0.03 g of ethylene-vinyl acetate copolymer having 45% of vinyl acetate were dissolved separately in a proper amount of toluene, wherein reagent(3) was dissolved at 50° C. The resulting homogeneous solution was coated on a glass to form a film having a conductivity of $1.2 \times 10^{-6}$ S/cm as shown in Table 2.

EXAMPLE 20

The same procedures as described in Example 8 were employed. The reagents: (1)0.138 g of P3OT, (2) 0.033 g of DBSA, and (3) 0.028 g of poly(ethyl methacrylate) (Mw= 250,000) were dissolved separately in a proper amount of chloroform, wherein reagent (3) was dissolved at 50° C. The resulting homogeneous solution was cast to form a free-standing film of dark color with metallic luster having a conductivity of $2.2 \times 10^{-3}$ S/cm as shown in Table 2.

APPLIED EXAMPLE 1

The solution of doped conductive polymer blend prepared from Example 16 was coated on the epoxy resin substrate and allowed to dry. The adhesion of the coated film on the substrate was found to be quite well. The coated substrate was rubbed with a cloth and immediately tested for static electrical charge generation by placing the substrate above scraps of paper. No attraction of the paper scraps toward the coated substrate was observed, indicating that no static electrical charge was generated. However, it was found that the non-coated substrate did attract the scraps of paper after being rubbed with a cloth. Comparing the above two substrates, it is seen that the substrate coated with the conductive polymer blend has good anti-static electrical properties. Thus, the conductive polymer blend film can be used in the electronic components packaging, or as the anti-static coating for plastics and fibers.

The advantages and usefulness of this invention can be further illustrated by the following drawings and tables.

FIG. 1 shows UV-Vis spectra of the conductive polymer solutions of the present invention, wherein curve (a) is for the undoped P3OT/toluene solution; curve (b) the doped P3OT/toluene solution of Example 2; and curve (c) the doped P3OT/polystyrene/toluene solution of Example 11. It can be observed that both curves (b) and (c) show the peak at about 818 nm and the absorptions extending to 1500 nm. These absorptions are resulted from the formation of polaron/bipolaron on the main chain of P3OT. However, curve (a) does not show an absorption at above 500 nm. It can be concluded from the spectroscopic observations that P3OT can be doped by dodecyl benzenesulfonic acid accompanying with an redox reaction and a formation of polaron/bipolaron in the main chains. The doped P3OT after blending with polystyrene also exhibiting polaron/bipolaron absorptions indicates that the doping state of the P3OT is still retained after the blending.

FIG. 2 shows IR spectra of the conductive polymer films of the present invention, wherein curve (a) is for the undoped P30T film; curve (b) the doped P3OT film of Example 4; and curve (c) the doped P3OT/polystyrene blend film of Example 17. It can be observed that, in comparison with curve (a), curves (b) and (c) show new peaks in the range 1400–1000 $cm^{-1}$ due to the generated C=C ring and C—C stretching vibrations on the ring of P3OT, which is resulted from the formation of polaron/bipolaron after the doping.

Table 1 shows the conductivities of the films of Example 1 to Example 7, in which three kinds of poly(3-alkylthiophene)s (P3ATS) are doped with protonic acids at various doping levels. The molar ratio of protonic acid to the repeating unit of P3AT varies from 0.02 to 0.6.

Table 2 shows the conductivities of the films of Example 8 to Example 20, in which the doped P3ATs are blended with several non-conductive polymers. The molar ratio of protonic acid to the repeating unit of P3AT varies from 0.1 to 50.

According to the results listed in Tables 1 and 2, it can be concluded as follows.

Referring to Examples 1 to 7, doping with protonic acid as low as 0.02 molar ratio can lead to a conductivity as high as $10^{-4}$ S/cm, which is two order higher than the lowest value $10^{-6}$ S/cm for anti-static application.

Comparing Example 4 with Example 17, and Example 5 with Example 18, it is known that at the weight ratio 0.15, the doped P3AT, after blending with a non-conductive polymer, still retains the conductivity at the same order.

Further referring to Examples 11, 12 and 13, it is found that incorporation of only about 2% by weight of the doped P3AT in the polymer blend can achieve relatively high conductivity, about $10^{-5}$ S/cm.

The protonic acid used according to this invention acts as a plasticizer as well as a dopant. The addition of such a protonic acid can prevent the doped polymer from shrinking and becoming brittle, also can improve the compatibility between the conductive polymer and the non-conductive polymer, thus improving the mechanical properties of the conductive film, and increasing the bonding strength between the conductive film and the substrate.

TABLE 1

The relationship between the content of the protonic acid and conductivity of the doped poly(3-alkylthiophene)s

| Examples | conductive polymer(C) | protonic acid(A) | A/C (molar ratio) | conductivity (S/cm) |
|---|---|---|---|---|
| Example 1 | P3DDT | A1 | 0.05 | $3.8 \times 10^{-4}$ |
| Example 2 | P3OT | A1 | 0.60 | $4.6 \times 10^{-1}$ |
| Example 3 | P3OT | A1 | 0.10 | $7.3 \times 10^{-3}$ |
| Example 4 | P3OT | A1 | 0.05 | $6.0 \times 10^{-4}$ |
| Example 5 | P3OT | A1 | 0.02 | $9.2 \times 10^{-5}$ |
| Example 6 | P3BT | A1 | 0.08 | $7.3 \times 10^{-3}$ |
| Example 7 | P3BT | A2 | 0.08 | $4.6 \times 10^{-4}$ |

P3DDT: poly(3-dodecylthiophene)
P3OT: poly(3-octylthiophene)
P3BT: poly(3-butylthiophene)
A1: dodecyl benzenesulfonic acid
A2: d-camphorsulfonic acid

TABLE 2

The conductivities of the conductive composite films

| Examples | conductive polymer (C) | protonic acid (A) | non-conductive polymer (P) | A/C (molar ratio) | P/C (weight ratio) | conductivity (S/cm) |
|---|---|---|---|---|---|---|
| Example 8  | P3DDT | A1 | PVAc | 0.04 | 0.08 | $5.5 \times 10^{-5}$ |
| Example 9  | P3DDT | A2 | PS   | 0.08 | 0.12 | $1.8 \times 10^{-4}$ |
| Example 10 | P3DDT | A2 | PPMA | 0.03 | 0.10 | $6.6 \times 10^{-6}$ |
| Example 11 | P3OT  | A1 | PS   | 0.60 | 50   | $5.5 \times 10^{-4}$ |
| Example 12 | P3OT  | A1 | PMMA | 0.60 | 50   | $4.4 \times 10^{-4}$ |
| Example 13 | P3OT  | A1 | PIB  | 0.60 | 1    | $1.2 \times 10^{-5}$ |
| Example 14 | P3OT  | A1 | PMMA | 0.08 | 0.15 | $4.4 \times 10^{-3}$ |
| Example 15 | P3OT  | A1 | PBMA | 0.08 | 0.15 | $8.4 \times 10^{-4}$ |
| Example 16 | P3OT  | A1 | PS   | 0.08 | 0.15 | $8.7 \times 10^{-3}$ |
| Example 17 | P3OT  | A1 | PS   | 0.05 | 0.15 | $1.0 \times 10^{-4}$ |
| Example 18 | P3OT  | A1 | PS   | 0.02 | 0.15 | $7.7 \times 10^{-5}$ |
| Example 19 | P3OT  | A1 | EVA  | 0.03 | 0.15 | $1.2 \times 10^{-6}$ |
| Example 20 | P3BT  | A1 | PEMA | 0.10 | 0.20 | $2.2 \times 10^{-3}$ |

P3DDT: poly(3-dodecylthiophene)
P3OT: poly(3-octylthiophene)
P3BT: poly(3-butylthiophene)
A1: dodecyl benzenesulfonic acid
A2: d-camphorsulfonic acid
PVAc: poly(vinyl acetate)
PS: polystyrene
PPMA: poly(n-propyl methacrylate)
PMMA: poly(methyl methacrylate)
PIB: poly(iso-butylene)
PBMA: poly(n-butyl methacrylate)
EVA: ethylene-vinyl acetate copolymer
PEMA: poly(ethyl methacrylate)

What is claimed is:

1. A homogeneously doped conductive polymer comprising:
   (a) a conductive polymer selected from the group consisting of 3,4-disubstituted poly(thiophene)s, 3,4-disubstituted poly(furan)s, 3,4-disubstituted poly(pyrrole)s, and 3,4-disubstituted poly(N-substituted pyrroles);
   wherein one substituent is selected from the group consisting of

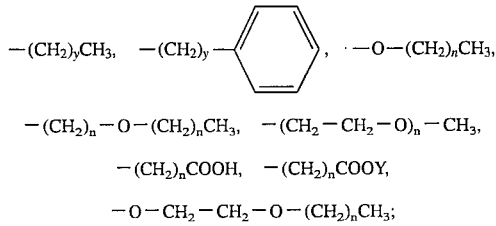

wherein y is an integer selected from 3 to 22;
   wherein n is an integer selected from 1 to 22;
   wherein —Y is selected from the group consisting of

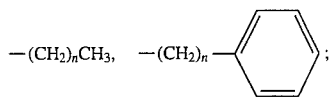

wherein the other substituent is selected from the group consisting of —H, —CH$_3$, and —OCH$_3$; and
   (b) a protonic acid selected from the group consisting of R"—SO$_3$H wherein R" is selected from

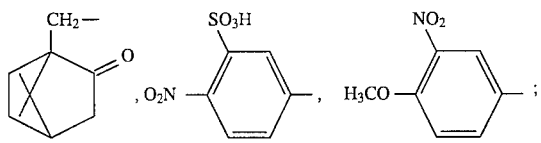

said protonic acid being homogeneously distributed throughout said doped conductive polymer.

2. The doped conductive polymer as claimed in claim 1, wherein said conductive polymer is a poly(thiophene); wherein one substituent is —(CH$_2$)$_y$CH$_3$ y being an integer selected from 3, 7, and 11, and the other substituent is —H.

3. The doped conductive polymer as claimed in claim 2, wherein y is 3.

4. The doped conductive polymer as claimed in claim 2, wherein y is 7.

5. The doped conductive polymer as claimed in claim 2, wherein y is 11.

6. The doped conductive polymer as claimed in claim 1, wherein the conductive polymer is a poly(pyrrole).

7. The doped conductive polymer as claimed in claim 1, wherein the conductive polymer is a poly(furan).

8. The doped conductive polymer as claimed in claim 1, wherein R" is

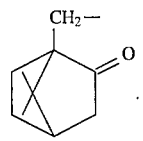

9. A homogeneously doped conductive polymer comprising:
   (a) a conductive polymer selected from the group consisting of 3,4-disubstituted poly(thiophene)s, 3,4-disubstituted poly(furan)s, 3,4-disubstituted poly(pyrroles), and 3,4-disubstituted poly(N-substituted pyrrole)s;
   wherein one substituent is selected from the group consisting of

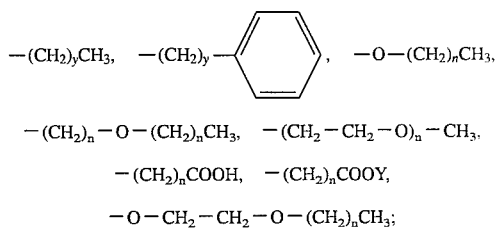

wherein y is an integer selected from 3 to 22;
   wherein n is an integer selected from 1 to 22;
   wherein —Y is selected from the group consisting of

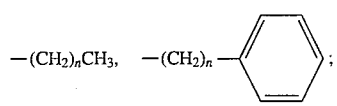

wherein the other substituent is selected from the group consisting of —H, —CH$_3$, and —OCH$_3$;
   (b) a protonic acid selected from the group consisting of R"—SO$_3$H wherein R is selected from

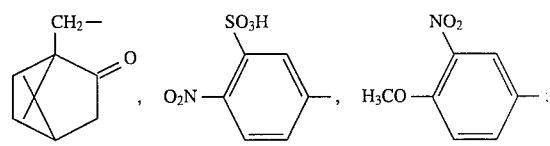

and
   (c) a non-conductive polymer, said protonic acid being homogeneously distributed throughout said doped conductive polymer.

10. The doped conductive polymer blend as claimed in claim 9, wherein said conductive polymer is a poly(thiophene); wherein one substituent is —(CH$_2$)$_y$CH$_3$, y being an integer selected from 3, 7, and 11, and the other substituent is —H.

11. The doped conductive polymer blend as claimed in claim 10, wherein y is 3.

12. The doped conductive polymer blend as claimed in claim 10, wherein y is 7.

13. The doped conductive polymer blend as claimed in claim 10, wherein y is 11.

14. The doped conductive polymer blend as claimed in claim 9, wherein the conductive polymer is a poly(pyrrole).

15. The doped conductive polymer blend as claimed in claim 9, wherein the conductive polymer is a poly(furan).

16. The doped conductive polymer blend as claimed in claim 15, wherein the conductive polymer is 3,4-disubstituted poly(furan).

17. The doped conductive polymer blend as claimed in claim 9, wherein R" is

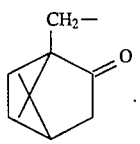

18. The doped conductive polymer blend as claimed in claim 9, wherein the non-conductive polymer is soluble in an organic solvent.

19. The doped conductive polymer blend as claimed in claim 18, wherein the non-conductive polymer is soluble in an organic solvent selected from the group consisting of toluene, chloroform, xylene, benzene, and tetrahydrofuran.

20. The doped conductive polymer blend as claimed in claim 9, wherein the non-conductive polymer is selected from the group consisting of poly(styrene)s, poly(methacrylic acid ester)s, poly(acrylic acid ester)s, poly(vinyl ester)s, poly(vinyl chloride), poly(alkane)s, poly(carbonate)s, poly(ester)s and poly(siloxane)s.

21. The doped conductive polymer blend as claimed in claim 9, wherein the non-conductive polymer is a copolymer having more than one monomers, in which the monomers are selected from the group consisting of styrenes, methacrylic acid esters, acrylic acid esters, vinyl chloride, and vinyl esters.

22. The doped conductive polymer blend as claimed in claim 9, wherein the non-conductive polymer is selected from the group consisting of poly(vinyl acetate), polystyrene, poly(n-propyl methacrylate), poly(methyl methacrylate), poly(iso-butylene), poly(n-butyl methacrylate), ethylene-vinyl acetate copolymer and poly(ethyl methacrylate).

\* \* \* \* \*